US011619187B2

(12) United States Patent
Serrano et al.

(10) Patent No.: US 11,619,187 B2
(45) Date of Patent: Apr. 4, 2023

(54) OPTIMIZING COMBUSTION RECIPES TO IMPROVE ENGINE PERFORMANCE AND EMISSIONS FOR VARIABLE DISPLACEMENT ENGINES

(71) Applicants: Tula Technology, Inc., San Jose, CA (US); Cummins Inc., Columbus, IN (US)

(72) Inventors: Louis J. Serrano, Los Gatos, CA (US); Xiaoping Cai, Fremont, CA (US); Shikui Kevin Chen, San Jose, CA (US); Benjamin M. Wolk, Oakland, CA (US); Avra Brahma, Fishers, IN (US); Justin R. Lee, Brownsburg, IN (US)

(73) Assignees: Tula Technology, Inc., San Jose, CA (US); Cummins Inc., Columbus, IN (US)

( * ) Notice: Subject to any disclaimer, the term of this patent is extended or adjusted under 35 U.S.C. 154(b) by 0 days.

(21) Appl. No.: 17/714,880

(22) Filed: Apr. 6, 2022

(65) Prior Publication Data

US 2022/0228538 A1 Jul. 21, 2022

Related U.S. Application Data

(63) Continuation of application No. 17/412,668, filed on Aug. 26, 2021, now Pat. No. 11,326,532, which is a (Continued)

(51) Int. Cl.
*F02D 41/00* (2006.01)
*F02D 17/02* (2006.01)
(Continued)

(52) U.S. Cl.
CPC ......... *F02D 41/0087* (2013.01); *F02D 17/02* (2013.01); *F02D 13/06* (2013.01); (Continued)

(58) Field of Classification Search
CPC .. F02B 29/0493; F02B 29/0418; Y02T 10/40; Y02T 10/12; F02M 26/05; (Continued)

(56) References Cited

U.S. PATENT DOCUMENTS 7,577,511 B1 8/2009 Tripathi et al.
7,849,835 B2 12/2010 Tripathi et al.
(Continued)

FOREIGN PATENT DOCUMENTS

CN 110259586 9/2019
DE 102007006937 * 8/2008 ............. F02D 41/14
(Continued)

OTHER PUBLICATIONS

Serrano et al., U.S. Appl. No. 17/412,668, filed Aug. 26, 2021.
(Continued)

*Primary Examiner* — Hai H Huynh
(74) *Attorney, Agent, or Firm* — Beyer Law Group LLP

(57) ABSTRACT

A system and method for transitioning a firing fraction of a variable displacement internal combustion engine when generating a desired torque output. During and following the transition to the second firing fraction, a combustion recipe is ascertained and used operating the cylinders of the variable displacement internal combustion engine to generate the desired torque output. The recipe is preferably optimized for the engine operating at the second firing fraction, at least relative to the previous charge of the previous combustion recipe used with the first firing fraction.

46 Claims, 5 Drawing Sheets

Related U.S. Application Data continuation of application No. 17/119,321, filed on Dec. 11, 2020, now Pat. No. 11,131,259.

(51) Int. Cl.
*F02D 37/02* (2006.01)
*F02D 13/06* (2006.01)

(52) U.S. Cl.
CPC ...... *F02D 37/02* (2013.01); *F02D 2200/0406* (2013.01); *F02D 2250/21* (2013.01)

(58) Field of Classification Search
CPC ................ F02M 26/25; F02D 2250/21; F02D 2200/0406; F02D 37/02; F02D 13/06; F02D 17/02; F02D 41/0055; F02D 41/0007; F02D 41/0087
USPC ............... 123/299, 300, 305, 435, 436, 481, 123/636–638; 701/103–105, 110
See application file for complete search history.

(56) References Cited

U.S. PATENT DOCUMENTS

| | | |
|---|---|---|
| 7,886,715 B2 | 2/2011 | Tripathi et al. |
| 7,954,474 B2 | 6/2011 | Tripathi et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,616,181 B2 | 12/2013 | Sahandiefanjani et al. |
| 8,701,628 B2 | 4/2014 | Tripathi et al. |
| 9,086,020 B2 | 7/2015 | Pirjaberi et al. |
| 9,120,478 B2 | 9/2015 | Carlson et al. |
| 9,200,575 B2 | 12/2015 | Shost et al. |
| 9,239,037 B2 | 1/2016 | Carlson et al. |
| 9,267,454 B2 | 2/2016 | Wilcutts et al. |
| 9,273,643 B2 | 3/2016 | Carlson et al. |
| 9,291,106 B2 | 3/2016 | Switkes et al. |
| 9,328,672 B2 | 5/2016 | Serrano et al. |
| 9,399,964 B2 | 7/2016 | Younkins et al. |
| 9,528,446 B2 | 12/2016 | Pirjaberi et al. |
| 9,650,971 B2 | 5/2017 | Pirjaberi et al. |
| 9,664,130 B2 | 5/2017 | Wilcutts et al. |
| 9,689,327 B2 | 6/2017 | Younkins et al. |
| 9,745,905 B2 | 8/2017 | Pirjaberi et al. |
| 9,777,658 B2 | 10/2017 | Nagashima et al. |
| 9,878,718 B2 | 1/2018 | Serrano et al. |
| 9,945,313 B2 | 4/2018 | Kotwicki et al. |
| 10,107,211 B2 | 10/2018 | Pirjaberi et al. |
| 10,138,860 B2 | 11/2018 | Nagashima et al. |
| 10,247,121 B2 | 4/2019 | Shost et al. |
| 10,259,461 B2 | 4/2019 | Serrano et al. |
| 10,436,133 B2 | 10/2019 | Pirjaberi et al. |
| 11,131,259 B1 | 9/2021 | Serrano et al. |
| 2010/0010724 A1 | 1/2010 | Tripathi et al. |
| 2013/0291816 A1 | 11/2013 | Serrano et al. |
| 2017/0370342 A1 | 12/2017 | Nagashima et al. |

FOREIGN PATENT DOCUMENTS

| | | | |
|---|---|---|---|
| DE | 102015215360 A1 * | 2/2017 | ............. F02D 37/02 |
| JP | 08-284727 | 10/1996 | |
| JP | H08284727 A | 10/1996 | |
| JP | 2004-27971 | 1/2004 | |
| JP | 2009-287541 | 12/2009 | |
| JP | 2014-125992 | 7/2014 | |
| JP | 2015-194097 | 11/2015 | |
| KR | 10-2020-0071174 | 6/2020 | |
| WO | WO 2010/006311 | 1/2010 | |
| WO | WO 2011/085383 | 7/2011 | |
| WO | WO 2020/046694 | 3/2020 | |

OTHER PUBLICATIONS

International Search Report and Written Opinion dated Feb. 4, 2022 from International Application No. PCT/US2021/054025.

Chinese Office Action dated Oct. 13, 2022 from Chinese Application No. 202180007025.2.

* cited by examiner

| Firing Fraction | frac | 1/7 | 1/6 | 1/5 | 1/4 | 2/7 | 1/3 | 2/5 | 3/7 | 1/2 | 4/7 | 3/5 | 2/3 | 5/7 | 3/4 | 4/5 | 5/6 | 6/7 | 1 |
|---|---|---|---|---|---|---|---|---|---|---|---|---|---|---|---|---|---|---|---|
| Combination Recipe Correction Fraction | frac | 1/7 | 1/6 | 1/5 | 1/4 | 2/7 | 1/3 | 2/5 | 3/7 | 1/2 | 4/7 | 3/5 | 2/3 | 5/7 | 3/4 | 4/5 | 5/6 | 6/7 | 1 |
| Combination Recipe Ratio of Fired Cylinders with (FF<1) Compared to all Cylinders Fired (FF=1) At the Same Cylinder Load | ratio | 1 | 1 | 1 | 1 | 1 | 1 | 1 | 1 | 1 | 1 | 1 | 1 | 1 | 1 | 1 | 1 | 1 | |

| Firing Fraction | frac | 1.7 | 1.6 | 1/5 | 1/4 | 2/7 | 1/3 | 2/5 | 3/7 | 1/2 | 4/7 | 3/5 | 2/3 | 5/7 | 3/4 | 4/5 | 5/6 | 6/7 | 1 |
|---|---|---|---|---|---|---|---|---|---|---|---|---|---|---|---|---|---|---|---|
| Induction Ratio | decimal | 0.143 | 0.167 | 0.200 | 0.250 | 0.286 | 0.333 | 0.400 | 0.429 | 0.500 | 0.571 | 0.600 | 0.667 | 0.714 | 0.750 | 0.800 | 0.833 | 0.857 | 1.000 |
| Combination Recipe | decimal | 0.143 | 0.206 | 0.200 | 0.274 | 0.286 | 0.365 | 0.400 | 0.429 | 0.524 | 0.571 | 0.600 | 0.683 | 0.714 | 0.750 | 0.800 | 0.841 | 0.857 | 1.000 |
| Correction Fraction | frac | 0.143 | 0.206 | 0.200 | 0.274 | 0.286 | 0.365 | 0.400 | 0.429 | 0.524 | 0.571 | 0.600 | 0.683 | 0.714 | 0.750 | 0.800 | 0.841 | 0.857 | 1.000 |

| Firing Fraction | frac | 1.7 | 1.6 | 1/5 | 1/4 | 2/7 | 1/3 | 2/5 | 3/7 | 1/2 | 4/7 | 3/5 | 2/3 | 5/7 | 3/4 | 4/5 | 5/6 | 6/7 | 1 |
|---|---|---|---|---|---|---|---|---|---|---|---|---|---|---|---|---|---|---|---|
| | decimal | 0.143 | 0.167 | 0.200 | 0.250 | 0.286 | 0.333 | 0.400 | 0.429 | 0.500 | 0.571 | 0.600 | 0.667 | 0.714 | 0.750 | 0.800 | 0.833 | 0.857 | 1.000 |
| Induction Ratio | decimal | 0.286 | 0.206 | 0.400 | 0.274 | 0.429 | 0.365 | 0.600 | 0.571 | 0.524 | 0.571 | 0.600 | 0.683 | 0.714 | 0.750 | 0.800 | 0.841 | 0.857 | 1.000 |
| Combination Recipe Correction Fraction | frac | 0.286 | 0.206 | 0.400 | 0.274 | 0.429 | 0.365 | 0.600 | 0.571 | 0.524 | 0.571 | 0.600 | 0.683 | 0.714 | 0.750 | 0.800 | 0.841 | 0.857 | 1.000 |

400

| Firing Fraction | frac | 1/7 | 1/6 | 1/5 | 1/4 | 2/7 | 1/3 | 2/5 | 3/7 | 1/2 | 4/7 | 3/5 | 2/3 | 5/7 | 3/4 | 4/5 | 5/6 | 6/7 | 1 |
|---|---|---|---|---|---|---|---|---|---|---|---|---|---|---|---|---|---|---|---|
| EGR Fraction correction (ratio of correction comparing to all fire (FF = 1) at the same cylinder load | ratio | <1 | 1 | <1 | <1 | <1 | 1 | <1 | <1 | 1 | <1 | <1 | 1 | <1 | <1 | 1 | <1 | <1 | 1 |

OPTIMIZING COMBUSTION RECIPES TO IMPROVE ENGINE PERFORMANCE AND EMISSIONS FOR VARIABLE DISPLACEMENT ENGINES

CROSS-REFERENCE TO RELATED APPLICATIONS

This application is a Continuation of U.S. application Ser. No. 17/412,668, filed Aug. 26, 2021, which is a Continuation of U.S. application Ser. No. 17/119,321, filed Dec. 11, 2020 (now U.S. Pat. No. 11,131,259, issued Sep. 28, 2021), both which are incorporated by reference herein for all purposes.

FIELD OF THE INVENTION

The present invention relates to variable displacement controlled engines, and more particularly, to various strategies for optimizing intake charge portion of combustion recipes, including amount of Exhaust Gas Recirculation (EGR), the amount of fresh air, and/or a degree of compression of the fresh air, to improve engine performance, reduce fuel consumption, control aftertreatment system temperatures, and to reduce emissions.

BACKGROUND

During operation, internal combustion engines (hereafter sometimes referred to as simply "engines" for the sake of brevity) require a "combustion recipe" to meet a desired torque demand, which include a combination of (a) a fuel injection strategy, such as number of injection pulses and start of injection timing of each pulse, and (b) a mixture of gases (e.g., a "charge") that when combusted, result in the desired torque output per cylinder. In various embodiments described herein, the charge of a given combustion recipe is referred to the portion related to the gas mixture (i.e. the intake charge), which typically includes some of EGR, and fresh air that is possibly compressed by various degrees by a turbo system. During an induction stroke for a given fired cylinder, a particular charge is inducted into the working chamber of the cylinder during the induction stroke, while fuel is injected either during the induction and/or compression stroke(s). With compression-ignition engines, temperature and pressure alone within the working chamber causes combustion, typically at the end of the compression stroke or start of the power stroke. With spark-ignition engines, a spark is used to initiate combustion, again typically at the end of the compression stroke or early in the power stroke.

Depending on the configuration of a given engine, the charge of a combustion recipe may vary. For example with boosted engines with a turbo system and an EGR system, the combustion recipe typically includes a mix of (a) recirculated exhaust gas from the EGR system as controlled by a position of an EGR valve and (b) fresh air which may or may not be compressed by a turbo system. With engines that do not have a turbo and/or an EGR system, the combustion recipe will not include a compressed air and/or re-circulated exhaust gas component respectively.

An issue with current variable displacement controlled engines, including skip fire controlled, is a lack of ability to adjust the charge for different skip fire fractions while the engine is generating a given torque output. Consider a six (6) cylinder engine generating 200 Newton meters (Nm) of torque with all cylinders fired (i.e., a firing fraction FF=1). Under such a scenario, the amount of fuel injected and the charge are each calibrated so that each cylinder generates approximately 33.33 Nm of torque (e.g., 6×33.33=200). If the same engine is operated under similar torque conditions of 200 Nm, but at a firing fraction of ½, then only three cylinders are fired. In which case, each of the fired cylinders is required to generate 66.66 Nm of torque (e.g., 3×66.66=200). While the fuel per cylinder in a variable displacement engine can be controlled easily, the corresponding gas mixture portion of combustion recipe must also change to provide optimal performance in terms of efficiency and emissions.

A system and method of optimizing the charge of a combustion recipe following a firing fraction transition while the engine is generating a given torque output is therefore needed.

SUMMARY OF THE INVENTION

The present invention relates to a method and system of optimizing the charge of a combustion recipe used following a firing fraction transition while the engine is generating a desired torque output. The method and system involve operating cylinders of the variable displacement internal combustion engine to generate the desired torque output at a first firing fraction and using a first charge of a first combustion recipe, ascertaining a second firing fraction and a second charge of a second combustion recipe for operating the cylinders of the variable displacement internal combustion engine to generate the desired torque output, and operating the cylinders of the variable displacement internal combustion engine at the second firing fraction and using the second charge of the second combustion recipe to generate the desired torque output. In a preferred but non-exclusive embodiment, the second charge is optimized for the engine operating at the second firing fraction, at least relative to using the first charge of the first combustion recipe.

BRIEF DESCRIPTION OF THE DRAWINGS

The invention and the advantages thereof may best be understood by reference to the following description taken in conjunction with the accompanying drawings in which:

FIGS. 2-5 are each exemplary tables for illustrating an optimization of charge combustion recipes for different firing fractions and different operating scenarios in accordance with a number of non-exclusive embodiments of the invention respectively.

In the drawings, like reference numerals are sometimes used to designate like structural elements. It should also be appreciated that the depictions in the figures are diagrammatic and not to scale.

DETAILED DESCRIPTION

The present invention relates to optimizing the charge of combustion recipes for a variable displacement engine when transitioning from one firing fraction to a second firing fraction, while generating a desired torque output. Depending on the configuration of the engine system, the optimization of the combustion recipe includes adjusting the amount of fuel as needed to meet the desired torque output and changing the charge as needed for the desired torque output per cylinder. In general the charge typically includes a mixture of (a) Exhaust Gas Recirculation (EGR), and (b) fresh air with some degree of compression. Optimizing the combustion recipe for a given firing fraction involves modifying the mass flows and/or ratio of the components (a) and (b) of the charge of the combustion recipe for the transition from the first firing fraction to the second firing fraction. By optimizing the charge of the combustion recipe for the second firing fraction, engine performance can be improved, fuel consumption can be reduced, aftertreatment system temperatures can be controlled, and harmful emissions can be reduced.

Engine Control

Figure 1:
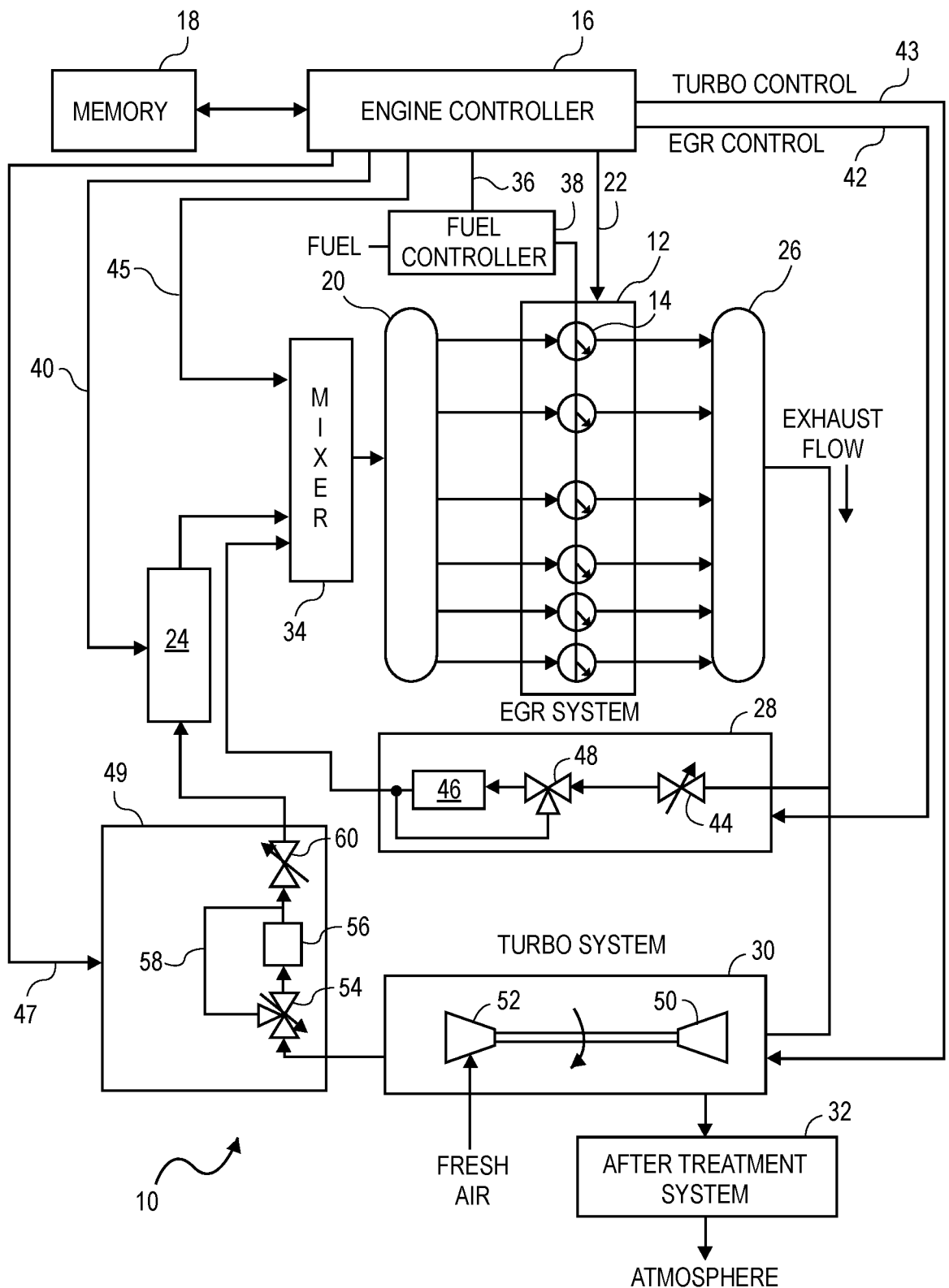
FIG. 1 is an engine system in accordance with a non-exclusive embodiment of the invention.

FIG. 1 illustrates an engine system 10, which includes a variable displacement internal combustion engine 12 (sometimes simply referred to simply as an "engine" for the sake of brevity) having multiple cylinders 14 where combustion occurs. The engine system 10 also includes an engine controller 16, memory 18, an air intake air manifold 20, an optional intake throttle 24, an exhaust manifold 26, an Exhaust Gas Recirculation (EGR) system 28, a turbo system 30 an aftertreatment system 32 and an optional mixer 34. In the embodiment shown, the engine 12 includes six (6) cylinders 14. It should be understood that the engine 12 as illustrated is merely exemplary and may include either fewer or more cylinders 14.

The operation of the engine system 10 is primarily controlled by the engine controller 16. The responsibilities of the engine controller 16 include, but are not limited to operating the engine 12 in a variable displacement manner by providing a firing fraction ("FF") control signal 22, providing a fuel control signal 36 to fuel controller 38, a throttle-control signal 40 for controlling the throttle 24, and an EGR control signal 42 for controlling the EGR system 28, a turbo control signal 43 for controlling the turbo system 30, an optional mixer control signal 45 for controlling the mixer 34, and a cooling control signal 47 for controlling an intercooler system 49. In embodiments where the amount of fresh air is controlled via the intake throttle 24, then the mixer control signal 45 for controlling the mixer may not be needed.

During operation of a vehicle (not illustrated) including the engine system 10, the engine controller 16 commands via control signal 22 for the engine 12 to operate at different firing fractions to meet desired torque demands as determined by the driver of the vehicle. The engine controller 16 also controls the amount of fuel of the combustion recipe the fuel controller 38 provides to the cylinders 14 of the engine via fuel control signal 36. Further, as described in more detail below, the engine controller 16 is further configured to control the charge of the combustion recipe provided to the intake manifold 20, for different firing fractions, by controlling one or more of:

(a) The amount of EGR from the EGR system 28 via EGR control signal 42;

(b) The amount or degree of compressed air from the turbo system 30 via turbo control signal 43 and intake throttle control signal 40; and (c) A degree of cooling of compressed air from the turbo system 30 by the intercooler 49 via cooling control signal 47; and Accordingly, the engine controller 16 can adjust the charge and/or temperature of a given combustion recipe by controlling the EGR system 28, the turbo system 30 and/or the intercooler 49. As such, the ratio and/or volume of EGR and fresh air, including an amount or degree of compression of the fresh air, as well as the temperature of the fresh air, can all be controlled.

The EGR System

The EGR system 28 includes an EGR valve 44 that adjustably controls the flow rate of exhaust gas from the exhaust manifold 26 to the mixer 34. The EGR system also optionally includes an exhaust gas cooler 46 that cools the hot exhaust gases before providing to the mixer 34. An optional exhaust gas cooler bypass valve 48 further allows some or all of the recirculated exhaust gas to be diverted around the exhaust gas cooler 46. During operation, the engine controller 16 generates the EGR valve control signal 42 that adjusts the EGR valve 44 to various positions between fully opened or fully closed. As a result, the volume of exhaust gas that is recirculated back to the cylinders 14 via the mixer 34 can be controlled for the purpose of mitigating or reducing hydrocarbon and/or $NO_x$ emissions.

The recirculation EGR tends to dilute the fresh air intake stream into the cylinders 14 with gases inert to combustion or at least having a lower oxygen level than fresh air. The exhaust gases act as absorbents of combustion generated heat and reduce peak temperatures within the cylinders 14. As a result, $NO_x$ emissions are typically reduced. In a compression-ignition Diesel engine for instance, the exhaust gas replaces some of the oxygen in the pre-combustion mixture. Since $NO_x$ forms primarily when a mixture of nitrogen and oxygen is subjected to high temperature, the lower combustion temperatures and reduction in the amount of oxygen in the working chamber cause a reduction in the amount of generated $NO_x$. However, if too much exhaust gas is present, then complete combustion within the fired cylinders 14 may not occur. As a result an increase in uncombusted hydrocarbons may occur.

The Turbo System

The turbo system 30 includes a turbine 50 and a compressor 52. During operation, the turbine 50 is rotated by the hot exhaust flow from the exhaust manifold 26 that is not recirculated by the EGR system 28. In turn, the rotating turbine 50 drives the compressor 52, causing the fresh air intake to be compressed, boosting its pressure at the output of the turbo system. In optional embodiments, the turbo system 30 may include a waste gate or variable vane or geometry turbine (not shown in FIG. 1) to control the amount of power extracted from the flowing exhaust gases. The amount or degree of compression is generally dictated by the engine controller 16 via the turbo control signal 43.

The exhaust flow from the turbocharger system 30 continues to the aftertreatment system 32, which removes noxious pollutants in the exhaust gas. The exhaust gas may then flow through an optional exhaust throttle (not illustrated) and then out a tailpipe into the atmosphere.

The Intercooler

In an optional embodiment, the output of the compressor 52 of the turbo system 30 may be directed to intercooler 49. Within the intercooler 49, a charge cooler bypass valve 54 is provided, which adjustably allows compressed air to flow into charge air cooler 56 or to be diverted via a bypass 58 around the charge air cooler 56. The charge air cooler 56 lowers the temperature of the compressed air, which in turn, allows more air to be pumped through the engine 12, increasing the maximum torque output. A variable valve 60 controls the amount of cooled and/or non-cooled compressed air provided to the intake throttle 24. Compared to a naturally aspirated engine, a boosted or compressed supply of air provided to the cylinders 14 of the engine 12 enables the generation of more power. With more air, proportionally more fuel can be input into the cylinders 14, resulting in more torque output.

Alternative Engine System Embodiments

In the embodiment shown in FIG. 1, the engine system includes the EGR system 28, the turbo system 30, the intercooler 49, intake throttle 24, and the mixer 34. It should be understood in alternative embodiments, the EGR system 28, the turbo system 30, intake throttle 24, the intercooler 49 systems are each optional. The need for the mixer 34 is therefore also optional and is generally not needed in implementations where either or both the EGR system 28 and/or the turbo system 30 are not present.

Alternative Engine Embodiments

It should be understood that the engine 12 as illustrated is merely exemplary and may include either fewer or more cylinders 14, such as, but not limited to 2, 3, 4, 5, 8, 10, 12, or 16 cylinders.

The engine 12 can be a compression ignition engine, a spark-ignition (SI) engine, an engine that combines spark ignition with compression ignition, or an engine that ignites the air fuel mixture with a different technology.

The engine 12 can be any type of engine that is capable of selectively operating at full displacement or one or more reduced displacements.

In one variable displacement embodiment, the engine 12 can be controlled in a conventional variable displacement manner where a group or bank of one or more cylinders 14 may be selectively deactivated to reduce the effective displacement of the engine 12 to less than full displacement. With the six cylinders 14 of the engine 12 for example, groups of two, three or four cylinders may be selectively deactivated while the remainder of the cylinders are active or fired. The number of fired versus skipped cylinders is often expressed in terms of firing fractions such as ⅓, ½ and ⅔ for the examples provided herein respectively.

Skip Fire Engine Control

Skip fire engine control is a known approach for varying the effective displacement of internal combustion engines. During skip fire operation, some firing opportunities of cylinders are fired, while other firing opportunities of cylinders are skipped. By operating the engine at different firing densities or fractions (e.g., ⅛, 2/7, ⅓, ¼, ½, etc.), the engine is allowed to operate at different effective reduced displacements, all of which are less than the full displacement (i.e., a firing fraction of 1) of the engine. In a variation of skip fire, often called dynamic skip fire, the decision to fire or skip a cylinder is dynamically made either (a) on a firing opportunity-by-firing opportunity basis or (b) on an engine cycle-by-engine cycle basis.

Skip fire engine control contemplates selectively skipping the firing of certain cylinders 14 during selected firing opportunities. Thus, for a given effective engine displacement that is less than the full displacement, a particular cylinder 14 may be successively fired during one firing opportunity, skipped during the next firing opportunity and then selectively skipped or fired during the next firing opportunity. From an overall engine perspective, skip fire control sometimes results in successive engine cycles having a different pattern of skipped and fired cylinders. The firing sequence may also be expressed as a firing fraction or firing density, either of which indicates a ratio of fired firing opportunities to total firing opportunities.

With skip fire, much finer or refined engine control is possible than with conventional variable displacement engines. By way of comparison, fractions such as ⅓ may be implemented using skip fire engine control, but cannot be implemented with a conventional 4-cylinder variable displacement engine. For instance, a commercially available skip fire controller offered by the assignee of the present application provides for seventeen (17) different firing fractions, each indicative of a different reduced effective engine displacement.

With skip fire engine control, a number of advantages are realized. First, with skipped cylinders, pumping losses are reduced, thereby improving fuel efficiency. Second, the displacement of the engine is effectively reduced; meaning the volume of exhaust gases passing through the aftertreatment system of the vehicle is reduced. By reducing the exhaust gas flow, the aftertreatment system of the vehicle can operate at higher temperatures, which in turn improves conversion efficiencies, which tends to decrease the output of noxious emissions.

Skip fire engine control is described in U.S. Pat. Nos. 7,954,474; 7,886,715; 7,849,835; 7,577,511; 8,099,224; 8,131,445; 8,131,447; 8,616,181; 8,701,628; 9,086,020; 9,120,478: 9,200,587; 9,650,971; 9,328,672; 9,239,037; 9,267,454; 9,273,643; 9,664,130; 9,945,313; and 9,291,106; and U.S. patent application Ser. No. 13/886,107; each of which is incorporated herein by reference in its entirety for all purposes.

With certain implementations of skip fire engine control, a decision to fire or not fire a given cylinder of an engine is made dynamically, meaning on a firing opportunity-by-firing opportunity or an engine cycle by engine cycle basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control or "DSF". For more details on DSF, see U.S. Pat. Nos. 7,849,835, 9,086,020 and 9,200,575, 10,247,121, each incorporated by reference herein for all purposes.

The memory 18 may be any type of memory, including volatile or non-volatile memory, and is used to store data useful for determining (a) a firing fraction for operating the engine 12, (b) combustion recipes for each firing fraction, and (c) EGR and/or turbo control positions for each firing fraction, etc. Such data may include tables, models derived from empirical data, algorithms, or any combination thereof.

Combustion Recipe Control Embodiments

The Applicant has found that by optimizing the charge of combustion recipes for different firing fractions of variable displacement engine generating a desired torque, a number of benefits can be realized, including improved engine performance, reduced fuel consumption, the control of aftertreatment system temperatures, and a reduction in harmful emissions. In the discussion below, it is assumed that the engine system 10 includes the EGR system 28, the turbo system 30, the intercooler 49 and the intake throttle 24. As such, the charge of a given combustion recipe includes a mixture of (a) EGR, (b) fresh air that (c) may be compressed to some degree and/or (d) cooled. The optimization of the charge of the combustion recipe thus involves one or more of:

(1) Adjusting the relative ratios of any of (a) and (b) with respect to one another within the charge;

(2) Adjusting the mass of either of (a) or (b) in the charge;

(3) Controlling a degree of compression if any of the fresh air of the charge; and (4) Controlling a degree of cooling if any of the fresh air in the charge.

Referring to FIGS. 2-5, a number of exemplary tables for illustrating an optimization of charge combustion recipes for different firing fractions and different operating scenarios in accordance with a number of non-exclusive embodiments of the invention are shown. Each of these tables is described in further detail below with respect to a number of examples.

Example 1

Consider the engine 12, with six cylinders 14, operating at an engine load of 100 Newton meters (Nm) of torque. With a firing fraction of one (FF=1), the torque output of each cylinder is approximately 16.67 Nm each. If the firing fraction is changed to one half (FF=½) for the same engine load, then each of the three fired cylinders 14 is required to double its output, or generate approximately 33.33 Nm each. In other words, the individual torque output of the three fired cylinders is essentially the same as if the overall engine load was 200 Nm, but since only three cylinders 14 are being fired, the overall torque engine output remains 100 Nm.

With a Diesel or other type of compression-ignition engine for example, the amount of fuel provided to each of the three fired cylinders is essentially doubled to achieve the desired result. However, using the same combustion recipe used per cylinder generating 16.67 Nm is not ideal when 33.33 Nm of torque per cylinder is needed. To address this discrepancy, this embodiment involves using a combustion recipe for an engine load of 200 Nm for the three fired cylinders. In other words, the following steps are initiated:

1. The fuel per cylinder X and the charge of the combustion recipe Y for the engine 12 with all cylinders 14 fired at 16.67 Nm per cylinder is determined based on the overall engine torque output of 100 Nm. The values for X and Y are typically ascertained from a Look Up Table (LUT) (not illustrated) maintained in storage location, such as memory 18 for example. During operation, the LUT is indexed using the output per cylinder (e.g., 16.67 Nm) to obtain the ideal values for X and Y. In the case of the latter, Y will typically include some ratio, mass and/or degree for each of (a) through (d) as described above.

2. If the firing fraction is changed to one half (FF=½), then it is determined that the three fired cylinders need to generate 33.33 Nm of torque per cylinder to meet the overall engine torque demand of 100 Nm. At 33.33 Nm of torque per cylinder, the overall engine torque output would be 200 Nm if all 6 cylinders are fired. Thus, to define an ideal combustion recipe at the FF=½, one approach is to:

a. Ascertain a value Z from the above mentioned LUT for the combustion recipe, where Z is the charge of the combustion recipe for the engine 12 when generating an overall torque output of 200 Nm. Again, Z will define some ratio and/or mass for each of (a) fresh air and (b) EGR, and (c) degree of air compression and (d) optionally cooling;

b. Divide the value of Z by 6 to achieve the combustion recipe per cylinders 14. In this case, the division results in a torque output of 33.33 Nm of torque per cylinder. But with a firing fraction of ½, the desired torque output of 100 Nm is achieved;

c. Double the fuel to 2X for each of the three fired cylinders 14.

The above example is summarized in Chart I below. In the first row, the firing fraction is one (FF=1) and the torque load on the engine is 100 Nm or 16.67 Nm per cylinder for a six cylinder engine. The fuel per cylinder is "X", the charge of the combustion recipe provided to the engine is ""Y", and the charge per cylinder with all six cylinders 14 fired is Y/6. As defined in the second row, the firing fraction is FF=½. As a result, only three cylinders are fired, each generating 33.33 Nm of torque. To achieve this result, the amount of fuel per cylinder is doubled or "2X", while the amount of charge per fired cylinder is Z/6.

CHART I

| Firing Fraction | Torque | Fuel per cylinder | Combustion Recipe for the Engine | Combustion Recipe per Fired Cylinder |
|---|---|---|---|---|
| 1.0 | 100 Nm with all 6 cylinders firing, or 16.67 Nm per cylinder | X | Y | Y/6 |
| 1.0 | 200 Nm with all 6 cylinders firing, or 33.33 Nm per cylinder | 2X | Z | Z/6 |
| 1/2 | 100 Nm with 3 cylinders firing or 33.33 Nm per fired cylinder | 2X | Z*k | Z*k/(6*FF) |

Figure 2:

Referring to FIG. 2, a table 200 illustrating how a correction factor k to correct Z to obtain a desired corrected value is shown. The table 200 includes three rows, including a top row listing a number of firing fractions ranging from ⅓ through 1, a second row that includes a Combustion Recipe Correction Fraction and a third row providing a ratio of amounts of desired charge of fired cylinder with a firing fraction less than one (FF<1) compared to all cylinders fired (FF=1) at the same cylinder load, i.e. the ratio of the last two cells in the rightmost column of Chart I, where FF and k are specified in the first row and the second row of table 200, respectively.

Air Springs (AS) Type Pneumatic Springs

With many skip fire engine control implementations, skipped cylinders 14 of the engine 12 can be operated to either pump air through the engine or as one of several different types of pneumatic springs, such as a Low Pressure Exhaust Spring (LPES), a High Pressure Exhaust Spring (HPES) or an Air Spring (AS). For more details on these types of pneumatic springs, see U.S. Pat. No. 10,619,584, incorporated herein by reference for all purposes.

When a cylinder 14 of the engine 12 is operated as an AS type pneumatic spring, the cylinder 14 is fired in one working cycle, exhausted in the same working cycle, and then a charge is inducted into the cylinder 14 during the immediately next working cycle. No fuel is injected, and as a result, no combustion occurs in the next working cycle. The exhaust valve is maintained closed in the next working cycle. As a result, relatively high pressure remains within the working chamber of the cylinder 14 (e.g., approximately 1 atmosphere and higher during compression). With the relatively high in-cylinder pressure, there is less chance that oil can be sucked into the chamber.

With variable displacement engines, however, a given cylinder may be operated as an AS type pneumatic spring over successive firing opportunities. When too many cycles are skipped, the in-cylinder pressure may drop too low, allowing oil to be sucked from the crank case into the working chamber. Oil entering the working chamber of a deactivated cylinder may possibly damage the engine and/or increase emissions. Situations where a given cylinder may be skipped over successive working cycles include both fixed-pattern firing fractions and rotating firing fraction patterns.

Fixed and Rotating Firing Fractions

Fixed firing patterns are those in which skips consecutively occur for the duration of the internal combustion engine operating at the same firing fraction. For example with a six cylinder internal combustion engine, all firing fraction with a denominator of 2, 3 or 6 (e.g., ⅙, ⅓/½. ⅔, ⅚ are fixed firing patterns. In the Chart II below, the firing pattern for a 6 cylinder engine operating at an exemplary fixed firing fraction of ½ (Skip-Fire-Skip-Fire pattern) is depicted. As is evident in the chart, the cylinders 1, 3 and 5 are continually skipped, while cylinder 2, 4 and 6 are continually fired.

| Chart II | | | | | | |
|---|---|---|---|---|---|---|
| FF = ½ | Cyl 1 | Cyl 2 | Cyl 3 | Cyl 4 | Cyl 5 | Cyl 6 |
| Cycle 1 | Skip | Fire | Skip | Fire | Skip | Fire |
| Cycle 2 | Skip | Fire | Skip | Fire | Skip | Fire |
| Cycle 3 | Skip | Fire | Skip | Fire | Skip | Fire |
| Cycle 4 | Skip | Fire | Skip | Fire | Skip | Fire |
| Cycle 5 | Skip | Fire | Skip | Fire | Skip | Fire |
| Cycle 6 | Skip | Fire | Skip | Fire | Skip | Fire |
| Cycle 7 | Skip | Fire | Skip | Fire | Skip | Fire |

With rotating firing fractions, the individual cylinders rotate between firing and skipping while operating at certain firing fractions. Again, for the same six cylinder engine, the firing fractions with a denominator of 5 or 7 are rotating firing fractions. In Chart III below, the cylinder firing pattern for the same six cylinder engine operating at an exemplary rotating firing pattern of ⅖ (Skip-Fire-Skip-Skip-Fire) is illustrated. As is evident from Chart III, all the cylinders are both fired and skipped.

| Chart III | | | | | | |
|---|---|---|---|---|---|---|
| FF = ⅖ | Cyl 1 | Cyl 2 | Cyl 3 | Cyl 4 | Cyl 5 | Cyl 6 |
| Cycle 1 | Skip | Fire | Skip | Skip | Fire | Skip |
| Cycle 2 | Fire | Skip | Skip | Fire | Skip | Fire |
| Cycle 3 | Skip | Skip | Fire | Skip | Fire | Skip |
| Cycle 4 | Skip | Fire | Skip | Fire | Skip | Skip |
| Cycle 5 | Fire | Skip | Fire | Skip | Skip | Fire |
| Cycle 6 | Skip | Fire | Skip | Skip | Fire | Skip |
| Cycle 7 | Fire | Skip | Skip | Fire | Skip | Skip |

It is further noted that some firing fractions are considered "hybrid" because some cylinders exhibit a fixed pattern, while other cylinders exhibit a rotating pattern for a given firing fraction. Such hybrid firing fractions, again for the exemplary 6 cylinder engine, include ¼ and ¾. The Chart IV below illustrates the hybrid nature of the firing fraction of FF=¼ (Skip-Skip-Skip-Fire). As is evident in this example, cylinders 1, 3 and 5 exhibit a fixed firing pattern, while cylinders 2, 4 and 6 exhibit a rotating pattern. Similarly, a ¾ firing pattern is also hybrid, although the particular pattern of fixed and rotating of the cylinders is different.

| Chart IV | | | | | | |
|---|---|---|---|---|---|---|
| FF = ¼ | Cyl 1 | Cyl 2 | Cyl 3 | Cyl 4 | Cyl 5 | Cyl 6 |
| Cycle 1 | Skip | Skip | Skip | Fire | Skip | Skip |
| Cycle 2 | Skip | Fire | Skip | Skip | Skip | Fire |
| Cycle 3 | Skip | Skip | Skip | Fire | Skip | Skip |
| Cycle 4 | Skip | Fire | Skip | Skip | Skip | Fire |
| Cycle 5 | Skip | Skip | Skip | Fire | Skip | Skip |
| Cycle 6 | Skip | Fire | Skip | Skip | Skip | Fire |
| Cycle 7 | Skip | Skip | Skip | Fire | Skip | Skip |

A known strategy for preventing oil sucking into a working chamber of a cylinder 14 operating as an AS type pneumatic spring over successive working cycles (e.g., two or more successive cycles), regardless if the firing fraction is fixed, rotating, or hybrid is to periodically "recharge" the cylinder before to its pressure becomes excessively low. Recharging generally involves opening the intake valve during a skipped working cycle, allowing charge to be inducted so as to "recharge" the cylinder. Since fuel is typically not injected, there is no combustion and the cylinder remains deactivated, while its in-cylinder pressure is increased, preventing oil from entering the working chamber. For more details on the strategy for the recharging of skipped cylinders, see commonly assigned U.S. Provisional Application 63/071,295, entitled "Recharging Management for Skipping Cylinders", filed Aug. 27, 2020, incorporated by reference herein for all purposes.

In the examples below, a recharging strategy is used for both fixed and rotating firing patterns. With recharging, there are more induction events than firing events. Accordingly, in each of the examples provided below, the charge volume is increased to take into account to the additional charge needed for recharging.

Example 2—Air Springs and Fixed Firing Fractions

Referring to FIG. 3, a table 300 taking into account additional induction events for recharging cylinders operating as AS type pneumatic springs with a fixed firing pattern. The Table 300 includes three rows, including a top row listing a number of firing fractions ranging from ⅐ through 1 (and also expressed as decimal values), a second row that shows an induction ratio (expressed as a decimal, and which defines the number of inductions needed for both fired cylinders and recharged cylinders) for each of the firing fraction/decimals in the first row, and a third row that includes a Combustion Recipe Correction Fraction that indicates correction factor.

Since skipped cylinders 14 are operated as an AS type pneumatic spring in this example for all firing fractions other than one (FF=1), there is a possibility cylinder recharging will be needed for all fixed firing pattern fractions other than one. With each cylinder recharging event, charge is inducted into the cylinder 14 in question. As a result, a larger amount of charge of a given combustion recipe is needed. By increasing the charge volume, the charge needed for combustion of fired cylinders is available, while the additional charge is used for the induction events during the recharging of skipped cylinders.

In the FIG. 3 example, it is assumed that a recharge is performed for each cylinder every predetermined number of engine cycles. In this particular non-exclusive embodiment, the predetermined number of engine cycles is twenty-one (21). It should be understood that the predetermined number of engine cycles is by no means limited to twenty one and can be either higher or lower. The mass or amount of the charge of the combustion accordingly needs to be adjusted to take into account recharges that occur in this example every 21 consecutively skipped cycles. In this particular example, with the firing fraction of ⅙ or 0.167, the induction ratio is slightly higher at 0.206. The higher induction ratio therefore takes into account not only the number of fired cylinder events at the ⅙ firing fraction, but also the number of recharge events. Hence, the charge of the combustion recipe correction fraction is adjusted upward for this firing fraction.

It is noted in the FIG. 3 example, the engine charge flow correction value is adjusted upward in a similar manner for the additional firing fractions of ¼, ⅓, ½, ⅔, and ⅚. However, no similar compensation is made for the firing fractions of ⅐, ⅕, 2/7, ⅖, 3/7, 4/7, ⅗, 5/7, ¾, ⅘, 6/7 and 1.0, since there is no possibility that a given cylinder will be successively skipped over twenty-one (21) engine cycles with these fractions.

It should be understood that the particular values provided in the Table of FIG. 3 are merely exemplary and should not be construed is limiting in any regard. In other embodiments and for different engines, these values would likely be different and would likely be obtained based on empirical data collected for a particular engine.

Example 3—Air Springs and Rotating Firing Fractions

An issue with AS type pneumatic springs is that temperature fluctuations tend to occur within the walls of the combustion chamber of the cylinder 14. During compression, the charge within the cylinder tends to heat up and then cool down during the subsequent expansion. Over the course of several successive working cycles, the walls of a cylinder 14 may significantly cool to the point that the internal temperature within the chamber is less than ideal for any subsequent firing. A cooled cylinder is problematic for combustion at least two reasons. First, the cooler temperature tends to delay combustion, particular with compression-ignition type engines, which rely on heat and pressure for ignition. Second, the vaporization of fuel injected into the cylinder 14 is impeded, often causing fuel to impinge on the walls of the cylinder, which causes higher levels of soot and other particulate emissions during combustion.

To avoid significant or excessive cylinder cooling while operating as an AS type pneumatic spring, the Applicant proposes performing a recharge just prior to a fire for certain firing fractions. For example, with a firing fraction of ⅐, a given cylinder 14 may be skipped and operated as an AS type spring over six successive engine cycles before being fired during the seventh engine cycle. To avoid the aforementioned cooling, a recharge is performed in the sixth engine cycle, just prior to the seventh engine cycle in which the cylinder 14 is fired. For example, the fire/skip/recharge sequence for a cylinder 16 with a firing fraction of ⅐ is (Skip-Skip-Skip-Skip-Skip-Recharge-Fire). Similarly, for a firing fraction of ⅕, the sequence for the same cylinder 14 is (Skip-Skip-Skip-Recharge-Fire), In both of these examples, there is only one fire event, but there are two induction events. As a result, the amount of charge of the combustion recipe needs to be adjusted to take into account both fires and recharges.

Figure 4:

Referring to FIG. 4, another table 400 taking into account additional induction events for recharging cylinders operating as AS type springs and rotating firing patterns is illustrated. With certain rotating patterns, it is common for a cylinder operating as an AS type pneumatic spring to be skipped two or more times. As noted above, by recharging the cylinder before a re-fire event after two or successive skips can improve combustion quality, and thus avoid potential incomplete or unstable combustion or even misfire.

The Table 400 includes three rows, including a top row listing a number of firing fractions ranging from ⅐ through 1 (and also expressed as decimal values), a second row that shows an induction ratio (expressed as a decimal) for each of the firing fraction/decimals in the first row, and a third row that includes a Combustion Recipe Correction Fraction that indicates a desired amount of charge needed for recharges.

The firing fractions in the table 400 can be categorized into two groups.

Group 1: Firing fractions 4/7, ⅗, 5/7, ¾, ⅘, 6/7 and 1. With these firing fractions, there is no possibility of a cylinder 14 skipping more than once over two successive engine cycles. Therefore, there is no need to ever perform a recharge for these fractions. Since there is no need for extra charge for any induction events, the induction ratio and the combustion recipe values are the same;

Group 2: Firing fractions ⅐, ⅕, 2/7, ⅖, and 3/7. With these firing fractions, a cylinder 14 may be skipped for two or more engine cycles. Consequently, there is a need to perform recharges for these fractions. As a result, the induction ratio is higher than the firing fraction and the charge of the combustion recipe is adjusted or corrected upward.

Example 4—Air Springs and Ignition Delays

As noted above, the operating a skipped cylinder 14 as AS type pneumatic springs over multiple skips adversely affects combustion upon a subsequent firing with compression ignition engines because the charge inside the cylinder cools. As a result during a subsequent firing, ignition may occur late or not at all (i.e., a misfire). With delayed or no ignition, the amount of torque generated by the cylinder is less than maximum or there is little to no torque generation at all.

With compression-ignition engines, such as Diesel engines, this ignition delay is characterized as the time between the start of fuel injection and the start of combustion. A number of steps can be used, besides or in addition to recharging as discussed above, to reduce the ignition delay of a cold cylinder 14.

In a paper published by Sandia National Laboratories, entitled "*The Influence of Charge Dilution and Injection Timing on Low-Temperature Diesel Combustion and Emissions*", by Kook, S., C. Bae, P. C. Miles, D. Choi, L. M. Pickett, *SAE Technical Paper* 2005-01-3837, doi:10.4271/ 2005-01-3837", 2005, a formula for calculating the ignition delay for a Diesel engine is proposed:

$$\tau_{id} = 12.254 p^{-1} X_{O_2}^{-1.2} \exp(3242.4/T)$$

Where $X_{O2}$ is the mole fraction of $O_2$ in the intake charge, P and T are charge pressure and temperature. $\tau_{id}$ is the ignition delay.

Based on the above equation, one option is to reduce the EGR fraction from the EGR system 28 by adjusting the EGR valve 44. By so doing, the oxygen ($O_2$) mole fraction in the charge is increased, shortening the ignition delay. However, by reducing the EGR fraction, which increases the $O_2$ mole fraction, NOx emissions may increase. Consequently, an optimized EGR value that does not result in excessive NOx emissions, but reduces the ignition delay, is ideally used.

Referring to FIG. 5, another table 500 is illustrated. In this table, the top row list a number of firing fractions for the engine 12, ranging from $\frac{1}{7}$ through 1. The second row shows any EGR fraction correction for each of the listed firing fractions. In this particular example:

(a) For the firing fractions of $\frac{1}{6}$, $\frac{1}{3}$, $\frac{2}{3}$, $\frac{5}{6}$ and 1, no EGR correction is required because these fractions do not have skips before firings. On the contrary, the same cylinders are fired all the time while the same cylinder(s) are skipped; and (b) For the firing fractions $\frac{1}{7}$, $\frac{1}{5}$, $\frac{1}{4}$, $\frac{2}{7}$, $\frac{2}{5}$, $\frac{3}{7}$, $\frac{4}{7}$, $\frac{3}{5}$, $\frac{5}{7}$, $\frac{3}{4}$, $\frac{4}{5}$ and $\frac{6}{7}$, certain cylinders 14 experience skips interspersed with fires. As a result, it is advantageous to reduce the EGR fraction or value an optimal amount to reduce the ignition delay without generating excessive NOx emissions.

Another option is to reduce the amount of cooling performed by the air cooler 56 of the intercooler 49. This is accomplished by the engine controller 16 adjusting the valve 54 via the control signal 47 so that some preferred amount of the compressed air from the turbocharger system 30 bypasses the charge air cooler 56. The net result is the temperature of the compressed air introduced into the intake manifold 20 is at higher temperature than if it was cooled. As a result, the charge inducted into a cylinder about to be fired partially compensates for the cooler temperature within the combustion chamber, which aids in reducing the ignition delay.

Yet another option is to increase the boost or compression of the air through the turbocharger system 30. With more compression, more air and more oxygen is present in the charge returned to the intake manifold 20. Again, the additional oxygen or mole oxygen ($O_2$) mole fraction tends to reduce the ignition delay.

In yet another option, multiple or split fuel injection can be used when injecting fuel into the cylinders 14. With multiple pulses, fuel can be injected earlier than typical, allow the fuel to better heat up and vaporize, resulting in earlier and more homogeneous combustion. In yet another option, a single injection may be used, but the start of the single injection is started sooner, allowing the fuel to better heat up and vaporize, again improving combustion.

Lastly, in certain situations, it may be advantageous to increase the ERG value and dilute the amount of oxygen and/or fresh air in the charge. For instance, if there is an excessive amount of oxygen present in the charge, due to for example excessive boosting by the turbocharger 30, then increasing the EGR in a controlled manner may be beneficial to control the timing of ignition and/or to better control emissions.

It is noted that in the above few examples involve Air Springs type pneumatic springs. It should be understood that this is by no means a requirement. Other type of pneumatic springs can be used, such as LPES or HPES. With LPES, the pressure within the working chambers of cylinders is relatively low. Thus, similar to AS type pneumatic springs, a similar recharging strategy can be used with LPES type pneumatic springs as well, meaning a similar combustion recipe correction factor may be used for recharging events. With HPES, the pressure within the working chambers of cylinders is typically higher than with either AS or LPES type pneumatic springs. However, like the other types of pneumatic springs, in-cylinder pressure may decay over successive skips. Again, a similar re-breathing strategy, with a combustion recipe including a correction factor for recharging events, may be used with HPES type pneumatic springs as well.

Example 5—Low Firing Fractions

With certain low firing fractions, the amount of air pumping through the engine 12 is reduced, which in turn reduces the amount of exhaust provide to the aftertreatment system 32. The turbocharger system 30, which is powered by the exhaust flow, may therefore be limited and may turn slowly, resulting in a lack of compression or boosting of the air provided to the intake manifold 20. Thus, a fired cylinder 14 may have less available charge than is ideal for a given cylinder load. For example with a low firing fraction such as $\frac{1}{5}$, the desired charge of the combustion recipe may be $V_1$, which may not be attainable due to a lower level of boosting by the turbocharger system 30. As a result, the charge may need to be reduced to another value $V_2$, which is less than $V_1$, assuming the firing fraction is maintained constant. In which case, the amount of fuel provided to the cylinder 14 may also have to be reduced in some situations. For example with a firing fraction of $\frac{1}{5}$, the amount of fuel received by the cylinder will typically be 5 times that received by the cylinder 14 if all the cylinders are fired (i.e., FF=1). If the ideal charge of the combustion recipe is not achievable because of the limitations of the turbocharger system 30, then the air-fuel ratio (AFR) may fall below a threshold for producing unacceptable amount of smoke or particulate emissions. If such a scenario occurs, then the amount of fuel is typically reduced so that the AFR remains above the threshold. Alternatively, the firing fraction can be increased so that that the total air intake charge is increased, which correspondingly results in an increase in the total exhaust flow. With more total exhaust flow, the turbocharger system 30 can be rotated at a higher rate, resulting in a higher degree of compression.

Example 6—EGR Limitations

In situations where the desired charge of the combustion recipe is reduced because and/or the amount of fuel is reduced because of limitations of the turbocharger system 30, then it may be advantageous to adjust the level of EGR as well. If the desired charge of the combustion recipe needs to be reduced because of the limitations of the turbocharger system 30, then the EGR may be too high, resulting in a sub-optimal trade-off between NOx and particulate emissions. Under these circumstances, the EGR fraction may be re-evaluated. If there is too much EGR, then the engine controller 16 may adjust the position of the valve 44 of the EGR system 28, reducing the amount of EGR as appropriate.

It should be noted that the values provided in the Chart I and the Tables 200-500 are merely exemplary and should not be construed as limiting in any regard. On the contrary, it should be understood that the Chart I and the Tables 200-500, including the values provided therein, may significantly differ and will likely vary from engine to engine and/or under different operating conditions.

It is further noted that the Tables 200-500 and/or the Chart I can be maintained in a storage location such as memory 18. Alternatively, these values contained in the Tables 200-500 and/or the Chart I can be calculated by the engine controller 16 on the fly or can be made available in any other manner.

Additional Embodiments

Although only a few embodiments have been described in detail, it should be appreciated that the present application may be implemented in many other forms without departing from the spirit or scope of the disclosure provided herein.

In optional embodiments, a supercharger or a twin-charger may be used to boost the air intake as well. The key difference between a turbocharger and a supercharger is that a supercharger is mechanically driven by the engine, often through a belt connected to the crankshaft, whereas a turbocharger is powered by a turbine driven by the exhaust gas of the engine. Compared with a mechanically driven supercharger, turbochargers tend to be more efficient, but less responsive. A twin-charger refers to an engine with both a supercharger and a turbocharger.

The present application is described primarily in the context of a six cylinder internal combustion engine suitable for use in motor vehicles. It should be understood, however, that the present application as described herein may be used with any type of internal combustion engine, regardless of the type of combustion and/or may be used with any engine regardless of the number of cylinders, including 1, 2, 3, 4, 5, 6, 8, 10, 14 cylinders or engines with more or fewer cylinders specifically recited herein. In addition, the internal combustion engine may use any type of combustible fuel, including but not limited to gasoline, diesel, ethanol, methanol, natural gas, or any combination thereof. Furthermore, the internal combustion engine may rely on various types of combustion and/or fuel charges, including but not limited to compression ignition, spark ignition, a stratified fuel charge, a homogeneous fuel charge, and a partial homogeneous charge. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders in an internal combustion engine.

Therefore, the present embodiments should be considered illustrative and not restrictive and is not to be limited to the details given herein but may be modified within the scope and equivalents of the appended claims.

What is claimed is:

1. A method of operating an Internal Combustion Engine (ICE), the method comprising:
    operating the ICE at a first firing fraction and a first combustion recipe during a first-time interval and operating the ICE at a second firing fraction and a second combustion recipe during a second time interval after the first-time interval; and
    operating the ICE to generate a same output torque during both the first-time interval using the first firing fraction and first combustion recipe and the second time interval using the second firing fraction and the second combustion recipe.

2. The method of claim 1, further comprising operating one or more cylinders of the ICE as an Air Spring (AS) during one or more skipped working cycles when operating at either the first firing fraction or the second firing fraction.

3. The method of claim 1, further comprising operating one or more cylinders of the ICE as a Low-Pressure Exhaust Spring (LPES) during one or more skipped working cycles when operating at either the first firing fraction or the second firing fraction.

4. The method of claim 1, further comprising operating one or more cylinders of the ICE as a High-Pressure Exhaust (HPES) during one or more skipped working cycles when operating at either the first firing fraction or the second firing fraction.

5. The method of claim 1, wherein operation of the ICE using the second firing fraction and the second combustion recipe results in a change of one or more operational parameter(s) relative to operating the ICE at the first firing fraction and the first combustion recipe.

6. The method of claim 5, wherein the one or more operational parameter(s) include:
    (a) reduced fuel consumption of the ICE;
    (b) improved performance of the ICE;
    (c) temperature control of an aftertreatment system fluidly coupled to the ICE; or
    (d) reduced emissions from the aftertreatment system.

7. The method of claim 1, further comprising adjusting fuel injection parameters while operating cylinders of the ICE using the second firing fraction and second combustion recipe relative to operating the ICE using the first firing fraction and the first combustion recipe, the adjustment of the fuel injection parameters including one of the following:
    (a) adjusting a start time of fuel injection;
    (b) using a different number of pulses of fuel; or
    (c) a combination of both (a) and (b).

8. The method of claim 1, further comprising:
    ascertaining a number of cylinder recharging events expected to occur during at least a portion of the second time interval the ICE is operating at the second firing and using the second combustion recipe while generating the same torque as during the first time interval while operating at the first firing fraction using the first combustion recipe, wherein each of the ascertained number of cylinder recharging events involves inducting a charge into a chamber of a cylinder, while no combustion occurs, during a skipped firing event;
    adjusting at least one component of the second combustion recipe to compensate for the ascertained number of cylinder recharging events; and
    operating the ICE to generate the same output torque using the second firing fraction and the second combustion recipe with the at least one component adjusted to compensate for the number of cylinder recharging events.

9. The method of claim 8, wherein the adjustment of the at least one component of the second combustion recipe further comprises increasing a charge volume of the second combustion recipe to compensate for the ascertained number of cylinder recharging events.

10. The method of claim 1, further comprising periodically recharging cylinders of the ICE operating as a pneumatic gas spring and adjusting a charge provided to one or more of the cylinders of the ICE to compensate for one or more additional induction events associated with the periodic recharging of the cylinders.

11. The method of claim 1, wherein the first combustion recipe and the second combustion recipe each include one of the following:
    (a) fresh air;
    (b) Exhaust Gas Recirculation (EGR);
    (c) compression of the fresh air;
    (d) cooling of the fresh air; or
    (e) any combination of (a) through (d).

12. The method of claim 1, wherein the second combustion recipe further comprises adjusting, relative to the first combustion recipe, amounts of one or more of (a) fresh air, (b) EGR, (c) compression of the fresh air, and/or (d) cooling of the fresh air.

13. The method of claim 1, further comprising adjusting a mass of a second charge of the second combustion recipe relative to a first charge of the first combustion recipe.

14. The method of claim 1, further comprising adjusting a mass of fresh air included in a second charge of the second combustion recipe relative to a first charge of the first combustion recipe.

15. The method of claim 1, further comprising adjusting a mass of EGR provided in a second charge of the second combustion recipe relative to a first charge of the first combustion recipe.

16. The method of claim 1, further comprising adjusting a degree of compressed fresh air provided in a second charge of the second combustion recipe relative to a first charge of the first combustion recipe.

17. The method of claim 1, further comprising adjusting a degree of cooling of fresh air provided in a second charge of the second combustion recipe relative a first charge of the first combustion recipe.

18. The method of claim 1, further comprising increasing an oxygen mole fraction of a charge provided to a select cylinder of the ICE for a select firing opportunity, the increased oxygen mole fraction mitigating an ignition delay for the select cylinder caused by a cooling of the select cylinder.

19. The method of claim 1, further comprising reducing an amount of cooling of a charge provided to select cylinder of the ICE for a select firing opportunity, the reduced amount of cooling of the charge mitigating an ignition delay during the select firing opportunity caused by a cooling of the select cylinder.

20. The method of claim 1, further comprising increasing compression of a charge provided to a select cylinder of the ICE for a select firing opportunity, the increased compression of the charge resulting in an increased oxygen mole fraction of the charge.

21. The method of claim 1, further comprising:
reducing an amount of fuel provided to a select cylinder of the ICE that is to be fired if a degree of compressed air in a charge to be provided to the select cylinder is sufficiently low, the reduction of the amount of fuel mitigating an excessive smoke condition; and
reducing an amount of EGR included in a charge provided to a select cylinder of the ICE that is to be fired during a firing opportunity if an amount of compressed air in the charge is too low.

22. The method of claim 1, wherein the ICE is a variable displacement ICE capable of operating in one or more of the following modes:
(a) a skip fire mode where at least one cylinder is fired, skipped and either fired or skipped over successive working cycles while the ICE is operating at an effective reduced displacement that is less than full displacement of the ICE;
(b) in a dynamic skip fire mode wherein decisions to either fire or skip the cylinders of the ICE are dynamically made either (i) on a firing opportunity-by-firing opportunity basis or (ii) on an engine cycle-by-engine cycle basis;
(c) a fixed firing pattern where a first group of one or more cylinder(s) is/are continually fired and a second group of one or more cylinder(s) is/are continually skipped while the ICE is operating at a reduced displacement that is less than full displacement of the ICE; or
(d) a rotating firing pattern where individual cylinders of the ICE rotate between firing and skipping while operating at select firing fractions.

23. A controller configured to control operate an Internal Combustion Engine (ICI), the controller configured to:
operate the ICE at a first firing fraction and a first combustion recipe during a first-time interval and operate the ICE at a second firing fraction and a second combustion recipe during a second time interval after the first-time interval,
wherein the ICE generates a same output torque during both the first-time interval using the first firing fraction and first combustion recipe and the second time interval using the second firing fraction and the second combustion recipe.

24. The controller of claim 23, further configured to operate one or more cylinders of the ICE as an Air Spring (AS) during one or more skipped working cycles when operating at either the first firing fraction or the second firing fraction.

25. The controller of claim 23, further configured to operate one or more cylinders of the ICE as a Low-Pressure Exhaust Spring (LPES) during one or more skipped working cycles when operating the ICE at either the first firing fraction or the second firing fraction.

26. The controller of claim 23, further configured to operate one or more cylinders of the ICE as a High-Pressure Exhaust Spring (HPES) during one or more skipped working cycles when operating the ICE at either the first firing fraction or the second firing fraction.

27. The controller of claim 23, wherein the operation of the ICE using the second firing fraction and the second combustion recipe results in an adjustment of one or more operational parameter(s) relative to operating the ICE at the first firing fraction and the second combustion recipe.

28. The controller of claim 27, wherein the one or more operational parameter(s) include:
(a) reduced fuel consumption of the ICE;
(b) improved performance of the ICE;
(c) temperature control of an aftertreatment system fluidly coupled to the ICE; or
(d) reduced emissions from the aftertreatment system.

29. The controller of claim 23, further configured to adjust fuel injection parameters while operating cylinders of the ICE using the second firing fraction and the second combustion recipe relative to operating the ICE using the first firing fraction and the first combustion recipe, the adjustment of the fuel injection parameters including one of the following:
(a) adjusting a start time of fuel injection;
(b) using a different number of pulses of fuel; or
(c) a combination of both (a) and (b).

30. The controller of claim 23, further configured to:
ascertain a number of cylinder recharging events expected to occur during at least a portion of the second time interval the ICE is operating at the second firing fraction and using the second combustion recipe to generate the same torque as during the first time interval while operating at the first firing fraction using the first combustion recipe, wherein each of the ascertained number of cylinder recharging events involves inducting a charge into a chamber of a cylinder, while no combustion occurs, during a skipped firing event;

adjust at least one component of the second combustion recipe to compensate for the ascertained number of cylinder recharging events; and operate the ICE to generate the same output torque using the second firing fraction and the second combustion recipe with the at least one component adjusted to compensate for the number of cylinder recharging events.

31. The controller of claim 30, wherein the adjusting of the at least one component of the second combustion recipe involves increasing a charge volume of the second combustion recipe to compensate for the ascertained number of cylinder recharging events.

32. The controller of claim 23, further configured to periodically recharge cylinders of the ICE operating as a pneumatic gas spring and adjust a charge provided to one or more of the cylinders of the ICE to compensate for one or more additional induction events associated with the periodic recharging of the cylinders.

33. The controller of claim 23, wherein the first combustion recipe and the second combustion recipe each include one of the following:
(a) fresh air;
(b) Exhaust Gas Recirculation (EGR);
(c) compression of the fresh air;
(d) cooling of the fresh air; or
(e) any combination of (a) through (d).

34. The controller of claim 23, wherein the controller is further configured to adjust the second combustion recipe, relative to the first combustion recipe, amounts of one or more of (a) fresh air, (b) EGR, (c) compression of the fresh air, and/or (d) cooling of the fresh air.

35. The controller of claim 23, wherein the controller is further configured to adjust a mass of a second charge of the second combustion recipe relative to a first charge of the first combustion recipe.

36. The controller of claim 23, wherein the controller is further configured to adjust a mass of fresh air included in a second charge of the second combustion recipe relative to a first charge of the first combustion recipe.

37. The controller of claim 23, wherein the controller is further configured to adjust a mass of EGR provided in a second charge of the second combustion recipe relative to a first charge of the first combustion recipe.

38. The controller of claim 23, wherein the controller is further configured to adjust a degree of compressed fresh air provided in a second charge of the second combustion recipe relative to a first charge of the first combustion recipe.

39. The controller of claim 23, wherein the controller is further configured to adjust a degree of cooling of fresh air provided in a second charge of the second combustion recipe relative a first charge of the first combustion recipe.

40. The controller of claim 23, further configured to increase an oxygen mole fraction of a charge provided to a select cylinder of the ICE for a select firing opportunity, the increased oxygen mole fraction mitigating an ignition delay for the select cylinder caused by a cooling of the select cylinder.

41. The controller of claim 23, further configured to reduce an amount of cooling of a charge provided to select cylinder of the ICE for a select firing opportunity, the reduced amount of cooling of the charge mitigating an ignition delay during the select firing opportunity caused by a cooling of the select cylinder.

42. The controller of claim 23, further configured to increase compression of a charge provided to a select cylinder of the ICE for a select firing opportunity, the increased compression of the charge resulting in an increased oxygen mole fraction of the charge.

43. The controller of claim 23, further configured to reduce an amount of fuel provided to a select cylinder of the ICE that is to be fired if a degree of compressed air in a charge to be provided to the select cylinder is sufficiently low, the reduction of the amount of fuel mitigating an excessive smoke condition.

44. The controller of claim 23, further configured to reduce an amount of EGR included in a charge provided to a select cylinder of the ICE that is to be fired during a firing opportunity if an amount of compressed air in the charge is too low.

45. The controller of claim 23, wherein the controller is further configured to operate the ICE in one of the following effective reduced displacement modes:
(a) a skip fire mode where at least one cylinder is fired, skipped and either fired or skipped over successive working cycles while the ICE is operating at an effective reduced displacement that is less than full displacement of the ICE;
(b) in a dynamic skip fire mode wherein decisions to either fire or skip the cylinders of the ICE are dynamically made either (i) on a firing opportunity-by-firing opportunity basis or (ii) on an engine cycle-by-engine cycle basis;
(c) a fixed firing pattern where a first group of one or more cylinder(s) is/are continually fired and a second group of one or more cylinder(s) is/are continually skipped while the ICE is operating at a reduced displacement that is less than full displacement of the ICE; or
(d) a rotating firing pattern where individual cylinders of the ICE rotate between firing and skipping while operating at select firing fractions.

46. The controller of claim 23, wherein the ICE is one of the following:
(a) a spark-ignition engine;
(b) a compression-ignition engine:
(c) a gasoline engine;
(d) a Diesel engine;
(e) a lean-burn engine; or
(f) stoichiometric engine.

* * * * *